(12) United States Patent
Lammers et al.

(10) Patent No.: US 11,254,344 B2
(45) Date of Patent: Feb. 22, 2022

(54) METHOD AND TOOL FOR INTRODUCING ELECTRIC CONDUCTORS INTO AN OVERMOULDING OF A STEERING WHEEL FRAME

(71) Applicant: TRW AUTOMOTIVE SAFETY SYSTEMS GMBH, Aschaffenburg (DE)

(72) Inventors: Alexander Lammers, Mühltal (DE); Thomas Lind, Rieneck (DE)

(73) Assignee: TRW AUTOMOTIVE SAFETY SYSTEMS GMBH, Aschaffenburg (DE)

( * ) Notice: Subject to any disclaimer, the term of this patent is extended or adjusted under 35 U.S.C. 154(b) by 193 days.

(21) Appl. No.: 16/483,473

(22) PCT Filed: Jan. 17, 2018

(86) PCT No.: PCT/EP2018/051079
§ 371 (c)(1),
(2) Date: Aug. 5, 2019

(87) PCT Pub. No.: WO2018/145868
PCT Pub. Date: Aug. 16, 2018

(65) Prior Publication Data
US 2020/0017136 A1    Jan. 16, 2020

(30) Foreign Application Priority Data
Feb. 8, 2017  (DE) .......................... 10 2017 102 460.3

(51) Int. Cl.
*G01R 27/26* (2006.01)
*B62D 1/06* (2006.01)
(Continued)

(52) U.S. Cl.
CPC .............. *B62D 1/065* (2013.01); *G01D 5/24* (2013.01); *H05B 1/0236* (2013.01)

(58) Field of Classification Search
USPC ................. 324/658, 686, 660–663; 180/444
See application file for complete search history.

(56) References Cited

U.S. PATENT DOCUMENTS 10,556,612 B2 *  2/2020  Lammers ................ B26D 3/08
2013/0056455 A1   3/2013  Onishi et al.
(Continued)

FOREIGN PATENT DOCUMENTS

JP        2013237310      11/2013

*Primary Examiner* — Vincent Q Nguyen
(74) *Attorney, Agent, or Firm* — Tarolli, Sundheim Covell & Tummino LLP (57) ABSTRACT

A method for introducing electric conductors into an overmolding of a steering wheel frame is provided. The electric conductors are used for heating and shielding purposes and for sensing contact on a steering wheel. In a first step, at least one cut is introduced into the overmolding using a cutting tool. In a second step, both a first layer of an electric conductor and a second layer of an electric conductor are simultaneously introduced into the cut that has been created. The first layer forms both a heating layer for heating the steering wheel and a guard layer which, together with the second layer acting as a sensor layer, allows the capacitive sensing of hand contact.

20 Claims, 4 Drawing Sheets

(51) Int. Cl.
   *G01D 5/24*      (2006.01)
   *H05B 1/02*      (2006.01)

(56) References Cited

U.S. PATENT DOCUMENTS

| | | |
|---|---|---|
| 2015/0122790 A1 | 5/2015 | Yamada et al. |
| 2015/0336601 A1 | 11/2015 | Van'Tzelfde et al. |
| 2016/0236702 A1 | 8/2016 | Lammers |
| 2017/0334477 A1 | 11/2017 | Bossler et al. |

* cited by examiner

METHOD AND TOOL FOR INTRODUCING ELECTRIC CONDUCTORS INTO AN OVERMOULDING OF A STEERING WHEEL FRAME

RELATED APPLICATIONS

This application corresponds to PCT/EP2018/051079 filed Jan. 17, 2018, which claims the benefit of German Application No. 10 2017 102 460.3 filed Feb. 8, 2017, the subject matter of which are incorporated herein by reference in their entirety.

BACKGROUND OF THE INVENTION

The invention relates to a method and a tool for introducing electric conductors into an overmolding of a steering wheel frame. The invention moreover relates to a vehicle steering wheel comprising introduced electric conductors.

For reasons of comfort, vehicle steering wheels frequently include a steering wheel heating comprising one or more electric heating wires disposed in the steering wheel rim and/or in the steering wheel spokes of the vehicle steering wheel. In addition, up-to-date vehicle steering wheels frequently have sensors for sensing whether a driver presently holds at least one hand onto the vehicle steering wheel. Sensors of this type for sensing a hand, also referred to as HOD sensors (hands-on detection), comprise sensor wires disposed within the vehicle steering wheel.

It is one option of manufacturing a vehicle steering wheel comprising steering wheel heating and/or comprising sensors for hand-on detection to dispose mats including electric heating wires and/or sensor wires on the steering wheel rim and/or the steering wheel spokes. Said mats may be adhesively bonded to the overmolding, for example.

One alternative option is known from DE 10 2013 017 319 A1. This document describes a method in which a heating wire is directly introduced into an overmolding of a vehicle steering wheel surrounding the frame. For this purpose, a cut into which a heating and/or sensor wire is inserted is introduced into the overmolding. After that, the cut is closed due to the inherent elasticity of the overmolding and thus fixes the heating wire in position. Preferably, in this method introducing the cut and positioning the heating wire are performed in a joint working step so that this method is very efficient and quick. Moreover, no material is abraded in this method.

In current concepts for heating a vehicle steering wheel and for sensing contact on a steering wheel, as known from US 2015/0336601 A1, for example, between an overmolding surrounding the steering wheel frame and an outer wrapping there are provided a heater mat, a shield mat and a sensor mat, each including an electrically conducting wire mesh or the like (mat, strip etc.). A defined voltage is applied to the shield mat so as to obtain shielding of the system from the metallic steering wheel frame. Each of the heating operation and the hand (contact) sensing take place alternately at very short time intervals. The heating current and the shielding current may be provided by the same power supply or by different power supplies. Closely adjacent electric conductors of the hand contact sensor system may be insulated and, additionally, surrounded by a shielding so that no mutual interference of the transmitted signals will occur.

For other reasons, too, an active shield layer (so-called "guard layer") may be provided on top of the heater layer, more exactly speaking between the heater layer and the sensor layer. In contrast to passive shielding which is grounded, the guard layer may be connected, during the heating and contact sensing operation, to a predetermined electric potential that is varied depending on time and/or situation. In this way, the guard layer may be deliberately and specifically used to influence the conditions of the measurements for sensing contact on a steering wheel. Such proceeding is based on the fact that high currents are applied to the heating layer and without the use of the guard layer no unambiguous capacitive measurements are possible in the sensor layer.

In this context, also the requirements are made to provide an as large distance between the guard layer and the sensor layer and to design a more close-meshed guard layer, i.e. having a higher wire density than the sensor layer.

A design of this type having three layers (heating layer, guard layer and sensor layer) requires a very large space. Moreover, it has to be observed that, in the event of a desired hard feel within the steering wheel rim, it is not possible to apply a mat as otherwise usual beneath the outer (leather) wrapping. As a possible alternative, a combined heating/guard mat, e.g. in the form of a thin lattice net onto which the wires of both the heating layer and the guard layer are stitched, can be molded (first shot) and the sensor layer can be introduced into another outer molding (second shot), for example by the method known from DE 10 2013 017 319 A1. Since the heating layer in the inner molding (first shot) is arranged at a large distance from the outer steering wheel wrapping, the efficiency of the heat transfer is reduced at the outer steering wheel wrapping, however.

Apart from the drawbacks stated already, the above-described solutions involve further difficulties. For example, double molding (first and second shots) is subject to high tolerances especially in the rim area of the steering wheel. In addition, manual application of the combined heating/guard mat requires a high level of craftsmanship, and each fold in the carrier material thereof—due to the strong curves in the rim—affects the quality of the outer molding applied thereto (second shot of the double molding). Further, manufacture and use of the combined heating/guard mat involve great effort and high costs for positioning the copper wire on the steering wheel rim, as desired (stitching, carrier material, stitching thread, adhesive films, release paper, NTC (negative temperature coefficient) as temperature sensor, fixing tape for NTC, transport of the mats and manual application of the mats), which ultimately does not result in an added value of the end product.

SUMMARY OF THE INVENTION

It is the object of the invention to overcome the afore-described drawbacks and difficulties and to state, especially for steering wheels exhibiting a hard feel, a low-cost method for manufacturing a steering wheel which can be efficiently heated and contact of which can be reliably sensed by the vehicle electronic system.

This object is achieved by a method of introducing electric conductors into an overmolding of a steering wheel frame comprising the features of claim 1 as well as by a tool for introducing electric conductors into an overmolding of a steering wheel frame comprising the features of claim 8. Advantageous and useful configurations of the method according to the invention and of the tool according to the invention are stated in the related subclaims.

The method for introducing electric conductors into an overmolding of a steering wheel frame according to the invention, with the conductors being used especially for heating and shielding purposes and for sensing contact on a steering wheel, comprises the following steps: in a first method step, introducing at least one cut into the overmolding using a cutting tool and, in a second method step, simultaneously introducing both a first layer of an electric conductor and a second layer of an electric conductor into the cut that has been created. Preferably, the first layer forms both a heating layer for heating the steering wheel and a guard layer which, together with the second layer acting as a sensor layer, allows capacitive sensing of hand contact.

The invention is based, on the one hand, on the findings that the control device responsible for heating and sensing contact on a steering wheel may be arranged so that an inner first layer of a first electric conductor (hereinafter simplified to "first layer") can be optionally used both as heating layer and as guard layer. An outer second layer of a second electric conductor (hereinafter simplified to "second layer") forms the sensor layer. For the two desired functions of (i) heating the vehicle steering wheel and (ii) sensing contact on a steering wheel, any other layer of an electric conductor is not required. Such a two-layer structure is significantly more space-saving than a three-layer structure including a separate guard layer.

In the case of the two-layer structure according to the invention, the control device is programmed so that alternately (i) high heating current of several amperes is supplied to the first layer (heating operation) and (ii) a (varying) shielding potential is applied (hand contact sensing), i.e. heating operation and hand contact sensing alternate at very short time intervals of periods within the range of milliseconds. When the steering wheel heating is deactivated, the first layer is used exclusively as guard layer.

On the other hand, the invention is based on the findings that it is technically feasible, in an automated process, to simultaneously introduce two electric conductors into an overmolding of a steering wheel frame. Hence, the two layers of electric conductors which are sufficient for the desired functionalities according to the first findings can be introduced in the same method step.

Inserting two layers of electric conductors in one single process step according to the invention considerably reduces above all the manufacturing expenditure. However, the method according to the invention offers advantages also in the technical respect as well as regarding quality. The method according to the invention allows—apart from the already afore-mentioned saving of space—to position the first layer inter alia acting as a heating layer more closely to the steering wheel surface so that the heat generated in the first electric conductor can be exploited more efficiently. This applies in particular as compared to the procedure described in the beginning in which double molding is performed. Moreover, the method according to the invention offers the advantage over said procedure that in particular the electric conductor of the deeper first layer is laid more precisely, i.e. there is less deviation from a predetermined nominal depth.

As already explained, the two layers of the electric conductors are to be introduced at different depths (relating to the surface of the overmolding). In particular, the first layer acting as heating layer and guard layer is to be introduced more deeply into the overmolding than the second layer acting as sensor layer.

Of preference, the first layer and the second layer are introduced at a distance of from 0 to 3 mm, preferably from 0.8 to 1.5 mm, from each other.

The first layer and the second layer are preferably introduced at a constant distance from each other so that, when carrying out the method, a complex adjusting unit is not necessary on the tool used for introducing the electric conductors. This means that the electric conductor of the first layer extends substantially in parallel to the electric conductor of the second layer. Under certain circumstances, the positioning of the layers is subject to tolerances when introducing the electric conductors so that the distance between the two layers may slightly vary. Should said tolerances affect the sensor signals, this can be considered and compensated via the electronic system.

To ensure as efficient use of the heat output as possible, the first layer should be introduced at a maximum depth of 4 mm, preferably a maximum depth of 2.5 mm.

To ensure as reliable hand contact sensing as possible, the second layer should be introduced into a depth of from 0 to 1.5 mm, preferably of about 1.0 mm.

Cutting and introducing the first layer and the second layer of the electric conductors are preferably performed by a tool that is mounted on a freely programmable industrial robot having at least 3 axes, preferably 6 axes and moving the tool. Said industrial robot allows to freely select the guiding of the cut. Due to the high accuracy of said industrial robots, in addition reliable and uniform cuts are ensured.

For allowing even more complicated cuts, additionally or optionally also the steering wheel frame may be held on a second freely programmable industrial robot having at least 3 axes, preferably 6 axes and moving the steering wheel frame relative to the tool.

For the rest, the afore-mentioned object is also achieved by a method of heating a vehicle steering wheel and for sensing contact on a steering wheel, wherein a first electric conductor forming an inner first layer as well as a second electric conductor forming an outer second layer are introduced into an overmolding of a steering wheel rim, comprising the following steps:

during heating operation of the vehicle steering wheel (10), heating current of several amperes is applied to the first electric conductor (22) and during sensor operation of the vehicle steering wheel (10) said first electric conductor is connected to a predefined potential for active shielding of the second layer (22*b*);

the second electric conductor (22) is used as a sensor layer for capacitive sensing of hand contacts during sensor operation of the vehicle steering wheel (10); and at least the first electric conductor is alternately switched to the heating operation and to the sensor operation, especially wherein the time intervals of the heating operation and of the sensor operation include period lengths of less than a tenth of a second.

The object of the invention is also achieved by a tool for introducing electric conductors into an overmolding of a steering wheel frame which is especially suited for implementing the afore-described method. The tool comprises a cutting tool having a cutting unit that includes a cutting edge pointing to the cutting direction. The tool further comprises an inserting tool for the electric conductors. The cutting tool and the inserting tool are coupled to each other, and the inserting tool is attached, preferably directly, to the cutting unit against the cutting direction. In accordance with the invention, the inserting tool includes at least a first inserting passage through which a first electric conductor can be guided for forming a first layer and a second inserting passage through which a second electric conductor can be simultaneously guided for forming a second layer.

The tool according to the invention enables a simple and robust working process by automation.

The at least two inserting passages of the inserting tool may be defined by appropriate tubes allowing precise guiding of the electric conductors to be introduced.

Preferably, the inserting passages end in the cutting direction behind the cutting unit of the cutting tool so that the electric conductors are introduced into the cut with low resistance. Since the electric conductors cannot contact the edges of the cut, moreover damage of the edges of the cut by the electric conductors is reliably excluded.

For controlling a cutting depth, a tactile positioning tool and/or a contactless sensor control may be provided. In this way, measuring tolerances of the overmolding can be compensated without any significant influence on a predetermined desired cutting depth.

The invention also provides a vehicle steering wheel comprising a steering wheel frame, a steering wheel rim molded by overmolding and at least two layers of electric conductors, at least one cut in which the at least two layers of electric conductors are located being introduced in the overmolding. Of preference, the at least two layers are introduced in the overmolding of the steering wheel frame by the method according to the invention.

In accordance with one embodiment of the vehicle steering wheel, the cut has intersections of portions of the cut, wherein in the area of the intersections one of the intersecting portions of the cut has a larger depth and the two layers of electric conductors are inserted more deeply in said portion of the cut than the two layers of electric conductors in the superimposed portion. Said intersections are provided in particular in the area of an electric terminal to connect the conductor ends with little effort in a preferably compact manner to the power supply and/or to a control device of the vehicle.

BRIEF DESCRIPTION OF THE DRAWINGS

Further features and advantages of the invention will be evident from the following description and the attached drawings which are referred to. In the drawings.

DESCRIPTION

Figure 1:
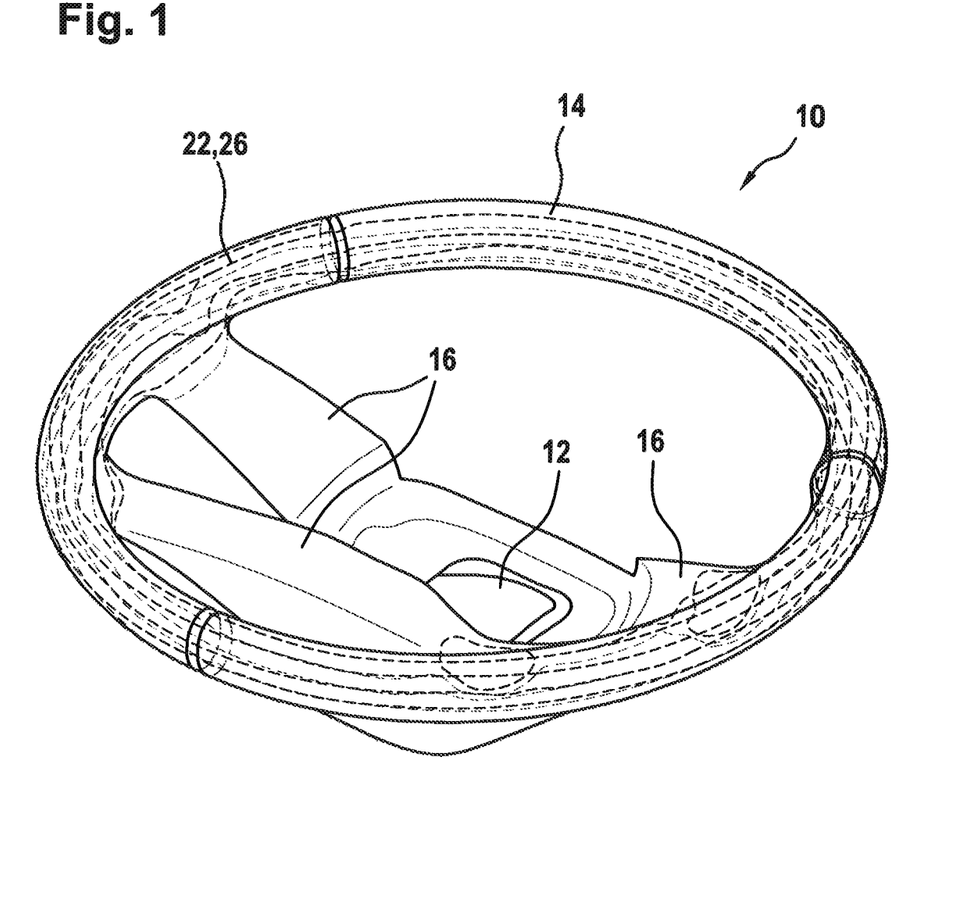
FIG. 1 shows a perspective view of a vehicle steering wheel according to the invention manufactured in accordance of the method of the invention comprising electric conductors introduced into the overmolding.
Figure 2A:
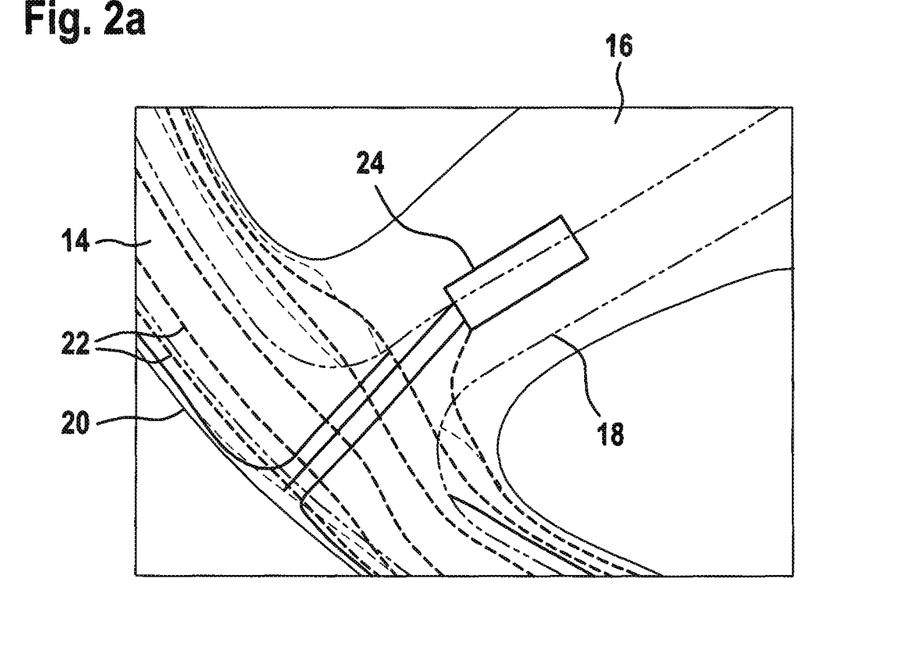
FIGS. 2a and 2b show detail views of the vehicle steering wheel of FIG. 1 in the area of a steering wheel spoke.
Figure 2B:
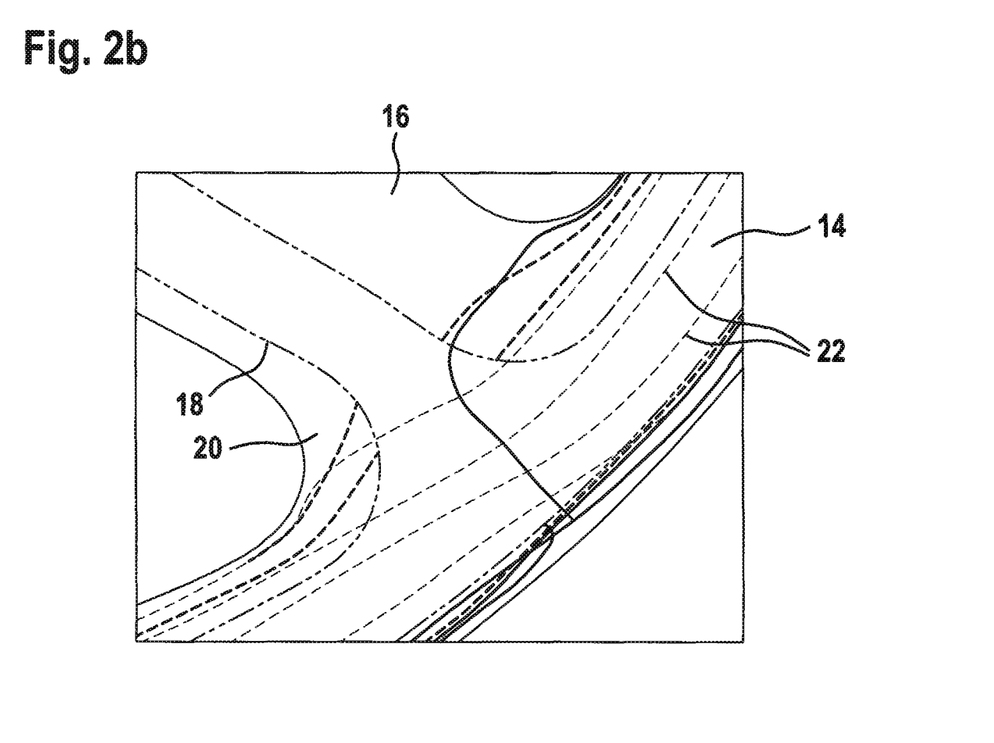

FIG. 1 illustrates a vehicle steering wheel 10 comprising a steering wheel hub 12, a steering wheel rim 14 and plural spokes 16 connecting the steering wheel hub 12 and the steering wheel rim 14 to each other. As is evident from FIGS. 2a and 2b, the vehicle steering wheel 10 has a steering wheel frame 18 made from hard material (preferably a light metal alloy) as well as one single overmolding 20 which completely encloses the outer face of the steering wheel frame 18 at least in the area of the steering wheel rim 14. The overmolding 20 provides for a "hard" feel and, of preference, has a Shore L hardness ranging from 40 to 100, with a typical value being 75 +/−5. A suitable material is, for example, polyurethane foam (PUR) or a suitable additional cover layer is an EPDM (ethylene-propylene-diene-rubber) between a PUR steering wheel overmolding and, for example, a leather wrapping of the vehicle steering wheel 10.

In the overmolding 20 plural electric conductors 22 are provided which are connected by a terminal 24 disposed at a spoke 16 (see FIG. 2a) to the power supply or to a control device of the vehicle. The electric conductors 22, of preference enameled copper wires, are introduced to the overmolding 20 in two layers 22a, 22b spaced apart from each other (see FIG. 4). The inner first layer 22a, i.e. which is closer to the steering wheel frame 18, functionally forms both a heating layer and an active shielding layer (guard layer). The outer second layer 22b, i.e. which is further remote from the steering wheel frame 18, forms a sensor layer. As described in the beginning, in its function of a heating layer the first layer 22a can be heated by being supplied with current in order to heat the vehicle steering wheel 10, in particular the steering wheel rim 14, while the same first layer 22a is used, in its function of guard layer, together with the second layer 22b (sensor layer) for capacitive sensing of steering wheel contacts.

As is evident from FIG. 1, cuts 26 made in the overmolding 20 into which the electric conductors 22 are introduced are guided circularly around the steering wheel hub 12 along the steering wheel rim 14. There may be provided plural circular cuts 26 extending substantially in parallel to each other, or one or more of said cuts may also be guided in several circulations around the steering wheel hub 12 along the steering wheel rim 14 at a small distance from each other so that a substantially spiral cut 26 is produced. When the electric conductor 22 is inserted into said spiral cut 26, it extends in several windings. Of course, it is advantageous when cuts are more adjacent to each other at the positions where a higher heat output is required. At least one cut 26 may include intersections of portions of the cut 26 in the area of the terminal 24, wherein, in the area of the intersections, one of the intersecting portions of the cut 26 has a larger depth and the two layers 22a, 22b of electric conductors 22 are inserted more deeply in said portion of the cut 26 than are the two intersecting layers 22a, 22b of the conductors 22 in the superimposed portion. In this way, opposed ends of the electric conductors 22 can be connected especially easily to the power supply of the vehicle.

The method described in more detail in the following enables the heat output and the sensing accuracy and, resp., sensing sensitivity to be locally adapted in a very flexible manner by just simply producing narrower and more cuts or narrower circulations of a spiral cut. The appropriate tool itself only has to be reprogrammed to carry out a different cut.

Figure 3:
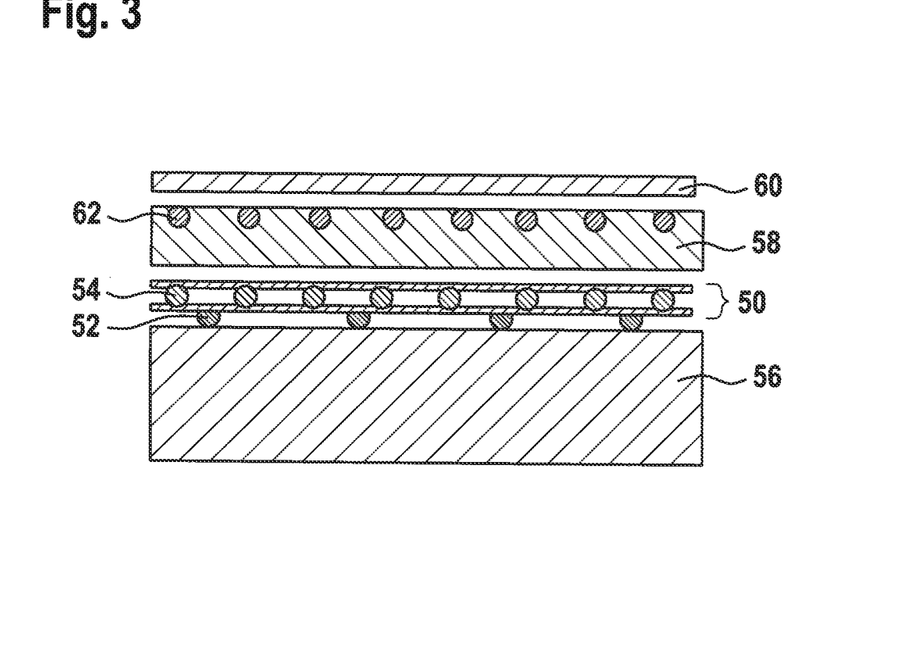
FIG. 3 shows a schematic detail view of a radial section across the steering wheel rim of a vehicle steering wheel that is not part of the invention.

In FIG. 3, a detail of a radial section across a steering wheel rim of a vehicle steering wheel that is not in accordance with the invention is shown as a conceptual sketch. A combined heating/guard mat 50, for example in the form of a thin lattice net to which wires of a heating layer 52 as well as wires of a guard layer 54 are stitched, is molded into a first inner molding 56. Into another outer molding 58 having a thickness of 2 to 3 mm, again surrounded by a wrapping 60, wires of a sensor layer 62 are introduced.

Figure 4:
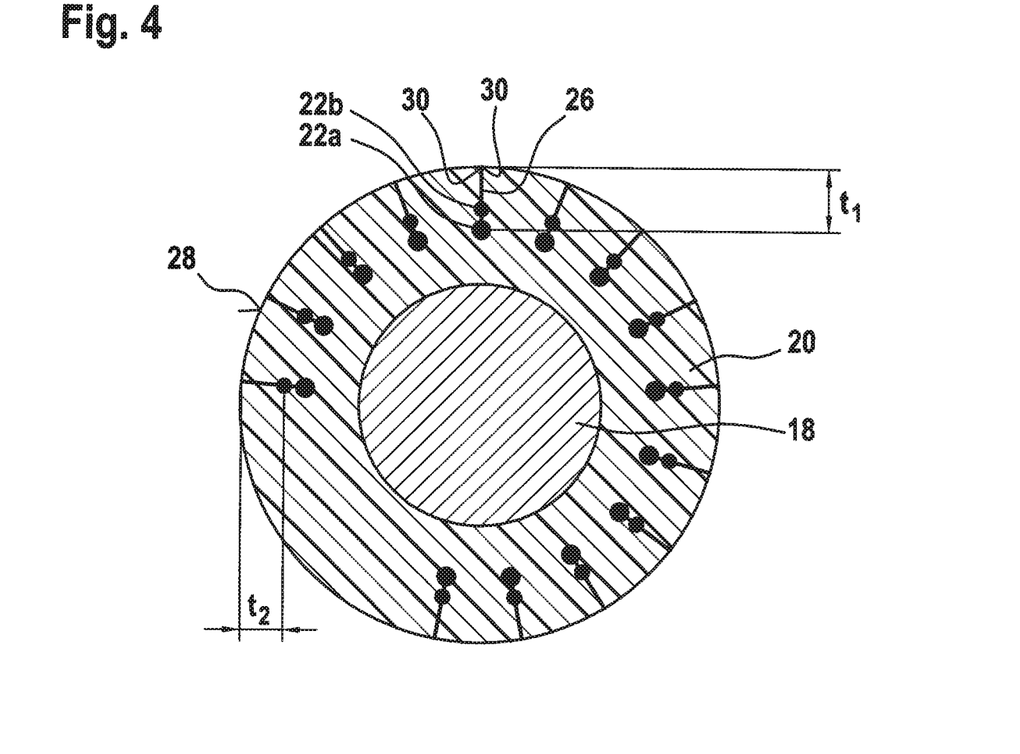
FIG. 4 shows a radial section across an embodiment of a steering wheel rim of a vehicle steering wheel according to the invention.

On the other hand, in the design of the steering wheel rim 14 according to the invention, as exemplified in FIG. 4, only one overmolding 20 is required which may further be surrounded by a wrapping (not shown), e.g. made from leather or artificial leather. A mat is not provided in this case, either. As schematically illustrated in FIG. 4, one or more cuts 26 that are guided substantially radially inwardly from the surface 28 of the overmolding 20 are introduced into the overmolding 20. The electric conductors 22 are introduced into said cuts 26 in two layers 22a, 22b.

The first layer 22a is laid at a maximum depth $t_1$ of 4 mm, preferably a maximum depth of 2.5 mm, while the second layer 22b is laid at a depth $t_2$ of from 0 to 1.5 mm. The distance $t_1$-$t_2$ between the two layers 22a, 22b is constant within the scope of tolerances inevitable when introducing the electric conductors 22. Consequently, the two layers 22a, 22b extend substantially in parallel to each other, with the distance ranging from 0 to about 3 mm, preferably from 0.8 to 1.5 mm.

As already described, the deeper first layer 22a forms a heating layer to be supplied with current for heating the vehicle steering wheel 10 and a guard layer, whereas the superimposed second layer 22b forms a sensor layer which is used, together with the guard layer connected to an appropriate potential, for sensing hand contacts.

The material of the overmolding 20 on the whole is elastic so that, after inserting the electric conductors 22 and, resp., introducing the cut 26, the edges 30 of the cut 26 spring back to an initial position in which the edges 30 of the cut are abutting. The electric conductors 22 thus are reliably held in position in the overmolding 20 and are protected against falling out.

For the rest, the electric conductor 22 preferably comprises at least one wire that is sheathed by a thermoplastic. After insertion of the electric conductor 22 in the overmolding 20, the at least one wire can be heated so strongly that the sheathing thermoplastic as well as the PUR overmolding 20 are melting at the edges of the cut 26. The at least one wire is bonded by the thermoplastic in the PUR overmolding 20. Further, a gap at the cut 26 is closed, as the melting operation relieves the PUR overmolding 20 and provides free space for the at least one wire.

Figure 5A:
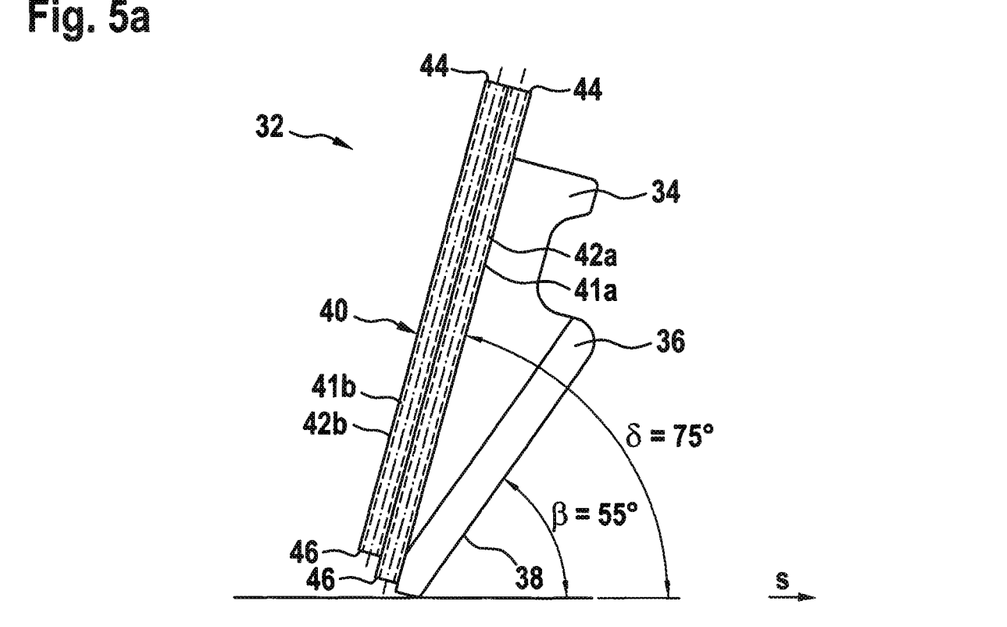
FIGS. 5a and 5b show a lateral view as well as a sectional lateral view of a tool according to the invention for introducing electric conductors into the vehicle steering wheel of FIG. 1.
Figure 5B:
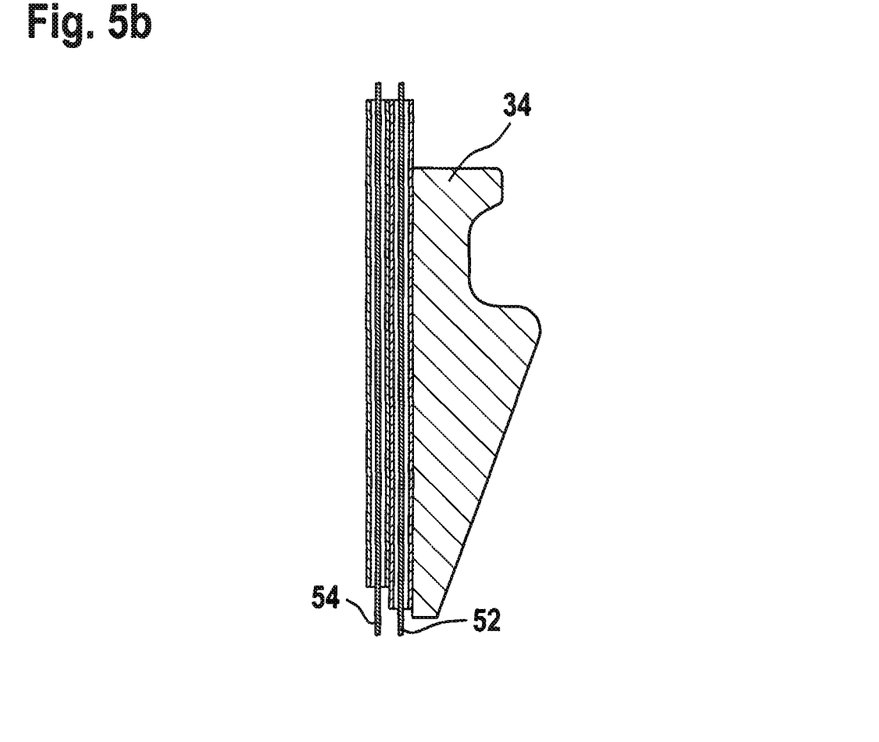

In FIGS. 5a and 5b a tool 32 according to the invention for facilitating introduction of said electric conductors 22 into an overmolding 20 of a steering wheel frame 18 is shown in two different orientations. The tool 32 has a cutting tool 34 including a cutting unit 36 that is formed by a blade in this embodiment. The cutting unit 36 has a V-shaped cutting edge 38 pointing in the cutting direction S enclosing a wedge angle from 30° to 40°, preferably of about 35°.

Directly adjacent to the rear side of the cutting edge 38, an inserting tool 40 having two inserting passages 42a, 42b defined by two tubes 41a, 41b is provided. Each of the inserting passages 42a, 42b is configured so that an electric conductor 22 can be pushed therethrough. A first end 44 of each inserting passage 42a, 42b is arranged so that, upon introducing a cut 26 into the overmolding 20, it is located outside the overmolding 20. The second opposite end 46 ends just behind the cutting unit 36 in the cutting direction S.

Irrespective of its shape, the cutting edge 38 may be guided into the overmolding at various cutting angles β relative to the cutting direction S. The cutting angle β is between 30° and 90°, preferably between 45° and 75° and, in the shown example embodiment, it is about 55°. In this case, an angle δ at which the inserting passages 42a, 42b extend relative to the cutting direction S amounts to about 75°.

Irrespective of the shape of the cutting unit 36 and, resp., of the cutting edge 38, the inserting tool 40 is mechanically tightly coupled to the cutting tool 34 and is configured so that the electric conductors 22 are introduced into the cut 26 at different depths independently of the angle β always at the same distance. The penetrating depths of the inserting passages 42a, 42b into the overmolding can be jointly adjusted by the inclination of the cutting unit 36 and the inserting passages 42a, 42b relative to the surface 28 of the overmolding 20 and/or by adjusting the inserting passages 42a, 42b relative to the deepest position of the cutting edge 38.

The cutting tool 34 may also include other cutting units 36, such as e.g. those having a cutting wire. Equally, the inserting tool 40 may also show a different design. The inserting tool 40 merely has to be ensured to be coupled to the cutting tool 34 and the inserting tool 40 has to be ensured to be directly adjacent to the cutting unit 36 against the cutting direction S so as to introduce the electric conductors 22 simultaneously with the cut 26 into the overmolding 20.

For introducing an electric conductor 22 into the overmolding 20 of a steering wheel frame 18, the tool 32 is attached to the surface 28 of the overmolding 20 and the cutting edge 38 is pressed into the overmolding 20 until the desired cutting depth of 0.8 mm to about 4 mm is reached.

Subsequently, the tool 32 is moved in the cutting direction S through the overmolding 20, thus causing a cut 26 to be introduced into the overmolding 20. At the same time, the electric conductors 22 are introduced, by feeds provided at the tool 32, through the inserting passages 42a, 42b into the cut 26 at a respective defined distance from the surface 28 of the overmolding 20. Preferably, the electric conductors 22 are unwound from supply rolls.

Hence, introduction of the cut 26 and introduction or insertion of the electric conductors 22 are performed simultaneously so that the electric conductors 22 are inserted, before the edges 30 of the cut 26 can contact each other again.

Since the cut 26 is closed directly behind the tool 32, i.e. after inserting the electric conductors 22, the electric conductors 22 are safely held inside the cut 26.

In addition, the cut 26 may also be closed after introducing the electric conductors 22, for example by adhesively bonding the edges 30 and/or by additional covering. The cut 26 may be covered, for example, by another overmolding or a wrapping, e.g. made from leather or artificial leather, or by a decorating element.

Since the electric conductors 22 are guided via the inserting passages 42a, 42b into the cut 26, the latter does not contact the edges 30 of the cut so that, on the one hand, the electric conductors 22 are introduced at low resistance and, on the other hand, any damage of the edges 30 of the cut or of the overmolding 20 by the electric conductors 22 is excluded.

In the embodiment described here, the width of the inserting tool 40 transversely to the cutting direction S approximately corresponds to the width of the cutting unit 36 (but it might also be selected to be smaller) so that no additional resistance in introducing the cut 26 is caused by the inserting tool 40. Alternatively, in several cases it may be advantageous, however, to select the width of the inserting tool 40 to be larger than the width of the cutting unit 36 and to accept a certain additional resistance of the inserting tool 40.

Introduction in the longitudinal direction of the steering wheel rim 14 offers the advantage that the cut or cuts 26 can be made by a freely programmable industrial robot having at least 3 axes, preferably 6 axes, on which the tool 32 is mounted, without the tool 32 having to be put down.

The depth of said cuts 26 may be monitored, for example, by appropriate control of the industrial robot and, resp., a tool subassembly including a tool 32 according to the invention and a subassembly for swiveling the tool 32.

However, it is also possible for such tool subassembly to additionally comprise a positioning tool by which the cutting depth is automatically set. The positioning tool comprises, for example, a rolling or sliding member spring-loaded against the surface of the overmolding 20 which remains in contact with the overmolding while the electric conductors 22 are introduced and guarantees a substantially constant cutting depth. Alternatively, also contactless setting of the cutting depth via distance measurement by sensors is imaginable, with the control of at least one programmable industrial robot being adapted on the basis of the sensor data so that constantly a desired cutting depth is set.

Moreover, especially when using a blade, said blade may also be moved in ultrasonic speed to increase the quality of the cut.

Of preference, the cut 26 is made without any material abrasion of the overmolding 20 so that the cut 26 is ensured to be closed completely after being introduced into the overmolding 20 and after inserting the electric conductors 22.

After laying and connecting the electric conductors 22, they can be heated so strongly by supplying current that the adjacent area of the overmolding 20 is softened and, after cooling, is bonded to the electric conductors 22.

Of preference, each electric conductor 22 includes at least one wire enclosed by a thermoplastic coating. When supplying current to and heating the electric conductors 22, the coating as well as the adjacent overmolding 20 are liquefied and/or softened for a short time, wherein the fused thermoplastic material adhesively bonds the overmolding 20 after cooling especially properly to the electric conductors 22, concretely speaking to the at least one wire of each electric conductor 22. Further, by heating and liquefying the thermoplastic material also the edge of the cut can be closed and bonded largely tightly again.

The invention claimed is:

1. A method for introducing electric conductors (22) into an overmolding (20) of a steering wheel frame (18), wherein the electric conductors (22) are used for heating and shielding purposes and for sensing contact on a steering wheel, comprising the following steps:
   in a first method step, introducing at least one cut (26) into the overmolding (20) using a cutting tool (34), and
   in a second method step, simultaneously introducing both a first layer (22a) of an electric conductor (22) and a second layer (22b) of an electric conductor (22) into a single cut (26) that has been created.

2. The method according to claim 1, wherein the first layer (22a) is introduced more deeply into the overmolding (20) than the second layer (22b).

3. The method according to claim 1, wherein the first layer (22a) and the second layer (22b) are introduced at a distance of from 0 to 3 mm from each other.

4. The method according to claim 1, wherein the first layer (22a) and the second layer (22b) are introduced at a substantially constant distance from each other.

5. The method according to claim 1, wherein the first layer (22a) is introduced into a maximum depth of 4 mm.

6. The method according to claim 1, wherein the second layer (22b) is introduced into a depth of from 0 to 1.5 mm.

7. The method according to claim 1, wherein the cut (26) and the introduction of the first layer (22a) and of the second layer (22b) of the electric conductors (22) are performed using a tool (32) mounted on a freely programmable industrial robot having at least 3 axes and moving the tool (32).

8. The method according to claim 7, wherein the steering wheel frame (18) is held on a second freely programmable industrial robot having at least 3 axes which moves the steering wheel frame (18) relative to the tool (32).

9. A tool (32) for introducing electric conductors (22) into an overmolding (20) of a steering wheel frame (18) and for implementing a method according to claim 1,
   wherein the tool (32) has a cutting tool (34) comprising a cutting unit (36) which includes a cutting edge (38) pointing in the cutting direction (S) as well as an inserting tool (40) for the electric conductors (22),
   wherein the cutting tool (34) and the inserting tool (40) are coupled to each other and the inserting tool (40) is adjacent to the cutting unit (36) against the cutting direction (S),
   wherein the inserting tool (40) has at least a first inserting passage (42a) through which a first electric conductor (22) can be guided for forming a first layer (22a) and a second inserting passage (42) through which simultaneously a second electric conductor (22) can be guided for forming a second layer (22b).

10. The tool according to claim 9, wherein controlling a cut depth a tactile positioning tool or a contactless sensor control is provided.

11. A vehicle steering wheel (10) comprising a steering wheel frame (18), a steering wheel rim (14) that is surrounded by an overmolding (20) and at least first and second layers (22a, 22b) of electric conductors (22), the first and second layers (22a, 22b) of the electric conductors (22) being introduced into the overmolding (20) in accordance with the method of claim 1.

12. The vehicle steering wheel according to claim 11, wherein the cut (26) has intersections of portions of the cut (26), wherein in the area of the intersections one of the intersecting portions of the cut (26) has a larger depth (t) and the two layers (22a, 22b) of electric conductors (22) are inserted more deeply in said portion of the cut (26) than are the two layers (22a, 22b) of electric conductors (22) in the superimposed portion.

13. A method for heating a vehicle steering wheel (10) and for sensing a contact on a steering wheel, wherein a first electric conductor (22) forming the first layer (22a) as well as a second electric conductor (22) forming the second layer (22b) are introduced into an overmolding (20) of a steering wheel rim (14) according to the method of claim 1, the first layer (22a) being spaced further from an outer surface (28) of the overmolding (20) than the second layer (22b), the method for heating the vehicle steering wheel (10) and for sensing a contact on the steering wheel (10) comprising the following steps:
   during heating operation of the vehicle steering wheel (10), heating current of several amperes is applied to the first electric conductor (22) and, during sensor operation of the vehicle steering wheel (10), the electric conductor (22) is connected to a predetermined potential for active shielding of the second layer (22a);
   during sensor operation of the vehicle steering wheel, the second electric conductor (22) is used as a sensor layer for capacitive sensing of hand contacts; and
   at least the first electric conductor is alternately switched to the heating operation and to the sensor operation, wherein the time intervals of the heating operation and the sensor operation show periods of less than a tenth of a second.

14. A method for introducing electric conductors (22) into an overmolding (20) of a steering wheel (10), the method comprising:
- introducing a cut (26) into the overmolding (20);
- introducing a first electric conductor (22) at a first depth ($t_1$) into the cut (26), the first electric conductor (22) forming a heating and shielding layer in the steering wheel (10);
- simultaneously with introducing the first electric conductor (22), introducing a second electric conductor (22) at a second depth ($t_2$) in the same cut (26) as the first electric conductor (22), the second depth ($t_2$) being different than the first depth ($t_1$), the second electric conductor (22) forming a sensor layer in the steering wheel (10) for sensing contact on a steering wheel (10).

15. The method according to claim 14, wherein the step of introducing a cut (26) into the overmolding (20) comprises introducing a plurality of cuts (26) into the overmolding (20), the method further comprising:
- introducing an associated first electric conductor (22) at the first depth ($t_1$) and an associated second electric conductor (22) at the second depth ($t_2$) into each cut (26), associated first and second electric conductors (22) of an associated cut (26) being introduced into the associated cut (26) at the same time.

16. A vehicle steering wheel (10) comprising a steering wheel frame (18), a steering wheel rim (14) that is surrounded by an overmolding (20), and first and second electric conductors (22) that are introduced into the overmolding (20) according to the method of claim 14.

17. The vehicle steering wheel according to claim 16, wherein the cut (26) has intersections of portions of the cut (26), wherein in the area of the intersections one of the intersecting portions of the cut (26) has a larger depth (t) and the first and second electric conductors (22) are inserted more deeply in said portion of the cut (26) than are the first and second electric conductors (22) in the superimposed portion.

18. The method according to claim 14, wherein the first electric conductor (22) being spaced further from an outer surface (28) of the overmolding (20) than the second electric conductor (22).

19. A tool (32) for introducing electric conductors (22) into an overmolding (20) of a steering wheel frame (18) and for implementing the method according to claim 14,
- wherein the tool (32) has a cutting tool (34) comprising a cutting unit (36) which includes a cutting edge (38) pointing in the cutting direction (S) as well as an inserting tool (40) for the electric conductors (22),
- wherein the cutting tool (34) and the inserting tool (40) are coupled to each other and the inserting tool (40) is adjacent to the cutting unit (36) against the cutting direction (S),
- wherein the inserting tool (40) has at least a first inserting passage (42a) through which the first electric conductor (22) can be guided for forming a first layer (22a) and a second inserting passage (42) through which simultaneously the second electric conductor (22) can be guided for forming a second layer (22b).

20. A method for heating a vehicle steering wheel (10) and for sensing a contact on a steering wheel, wherein the first electric conductor (22) forming an inner first layer (22a) as well as the second electric conductor (22) forming an outer second layer (22b) are introduced into an overmolding (20) of a steering wheel rim (14) in accordance with the method of claim 14, the method for heating the vehicle steering wheel (10) and for sensing a contact on the steering wheel (10) comprising:
- during heating operation of the vehicle steering wheel (10), heating current of several amperes is applied to the first electric conductor (22) and, during sensor operation of the vehicle steering wheel (10), the electric conductor (22) is connected to a predetermined potential for active shielding of the second layer (22a);
- during sensor operation of the vehicle steering wheel, the second electric conductor (22) is used as a sensor layer for capacitive sensing of hand contacts; and
- at least the first electric conductor is alternately switched to the heating operation and to the sensor operation, wherein the time intervals of the heating operation and the sensor operation show periods of less than a tenth of a second.

* * * * *